United States Patent Office 3,741,972
Patented June 26, 1973

3,741,972
17-MONOCHLOROACETYL AJMALINE AND PHARMACEUTICALLY ACCEPTABLE SALTS THEREOF
Attilio Bonati, Milan, Italy, assignor to Inverni Della Beffa S.p.A., Milan, Italy
No Drawing. Filed May 8, 1970, Ser. No. 35,880
Claims priority, application Great Britain, May 16, 1969, 25,142/69
Int. Cl. C07d 57/08
U.S. Cl. 260—293.53          3 Claims

ABSTRACT OF THE DISCLOSURE

The invention provides novel 17-acyl derivatives of ajmaline and salts thereof which have valuable therapeutic properties useful in the treatment of cardiac arrhythmia. The invention also provides a process for producing the 17-acyl compounds referred to, by partial hydrolysis or alcoholysis of the corresponding 17,21-acyl derivatives which may be in the form of the free base or a salt thereof.

---

This invention relates to new and useful derivatives of ajmaline.

United Kingdom patent specification No. 948,684 describes acyl-derivatives of ajmaline and salts thereof. It also describes a method of producing such compounds in which ajmaline is reacted with acylating reagents.

The method described in the above patent specification results in the production of 17,21 di-substituted ajmalines and 21 mono-substituted ajmalines or salts thereof; acyl derivatives which are substituted only in the 17-position are not formed.

It has now been found that 17-mono-substituted acyl derivatives of ajmaline can be obtained by the partial hydrolysis or alcoholysis of the corresponding 17,21-disubstituted acyl derivatives of ajmaline. These 17-acyl derivatives have therapeutical properties which are similar to those of the corresponding 17,21-diacyl derivatives and are superior to those of the corresponding 21-acyl derivatives. The 17-acyl derivatives and their salts are relatively stable even in the presence of water and can be obtained in a state of purity that facilitates the production of a standard pharmaceutical product.

Thus the invention comprises 17-acyl derivatives of ajmaline of the formula

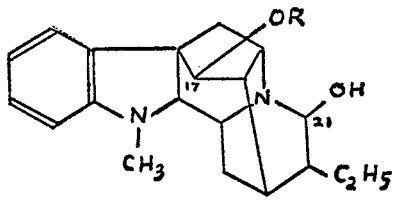

in which R represents an acyl radical derived from
(i) a saturated or unsaturated aliphatic mono- or polycarboxylic acid having more than two carbon atoms, or a partial ester of the polycarboxylic acid, or
(ii) a halogenated saturated aliphatic carboxylic acid, or
(iii) a halo, nitro-, or alkoxy-benzoic acid;

and salts of said 17-acyl derivatives of ajmaline.

Examples of 17 acyl derivatives of ajmaline of the invention include 17 - propionyl ajmaline, 17-butyryl ajmaline, 17-n-valeryl ajmaline, 17-carbomethoxypropionyl ajmaline and 17-monochloroacetyl ajmaline.

The invention also includes a process for the production of the 17-acyl derivatives of ajmaline referred to and the salts of said derivatives which comprises converting the corresponding 17,21-diacyl derivative of ajmaline, which may be in the form of the free base or a salt of the base, to the 17-acyl derivative by partial hydrolysis or alcoholysis. The conversion may be carried out using conventional techniques; suitable methods include aqueous hydrolysis which may be carried out in the presence of a catalyst such as a base or basic ion exchange resin, and alcoholysis with an alcohol which may also be carried out in the presence of a catalyst such as a base or a basic ion exchange resin. A mixture of water and an alcohol may be used in the conversion. When a 17,21-diacyl ajmaline is subjected to partial hydrolysis or alcoholysis this yields corresponding 17-acyl ajmaline. When an acid addition salt of a 17,21-diacyl ajmaline is used as the starting compound the 17-acyl product may be recovered as the free base or as a salt thereof. Thus by partial hydrolysis of an acid addition salt of a 17,21-acyl derivative of ajmaline in the absence of a base the corresponding acid addition salt of the 17-acyl derivative may be obtained. When a base is present in the hydrolysis reaction, the 17-acyl derivative may be formed as the free base and reacted with the acid to obtain the acid addition salt. The 17,21-diacyl derivatives or their salts may be obtained by using the methods set out in United Kingdom patent specification No. 948,684.

Non-toxic and therapeutically useful acid addition salts of the 17-acyl derivatives of ajmaline may be obtained from the free bases by reacting the free bases with an acid. Suitable acids include hydrochloric acid, sulphuric acid, nitric acid, perchloric acid, phosphoric acid, acetic acid, propionic acid, lactic acid, oxalic acid, succinic acid, malic acid, tartaric acid, citric acid, ascorbic acid, methane sulphonic acid, ethane sulphonic acid, hydroxyethane sulphonic acid, benzoic acid, salicylic acid, p-amino salicyclic acid and toluene sulphonic acid.

Non-toxic and therapeutically useful quaternary ammonium salts may be obtained by reaction of the free bases with alkyl halides.

The 17-acyl derivatives of ajmaline and their salts have the advantage that they are stable even in the presence of water, and are obtainable in a state of purity that facilitates the production of a standard pharmaceutical product. The novel compounds in the form either of the free bases or of salts, can be made up into preparations suitable for enteral, parenteral or intravenous administration, i.e. in the form of tablets, ampoules and other dosage unit forms, alone or in union with other medicaments, and with a pharmaceutically acceptable diluent or carrier. Salts which are more soluble in water than the free bases are preferably used in pharmaceutical preparations.

The following examples illustrate the production of 17-acyl derivatives of ajmaline and their salts in accordance with the invention.

EXAMPLE I 17-monochloroacetyl ajmaline hydrochloride (a) 16.5 g. of 17,21-dimonochloroacetyl ajmaline hydrochloride are warmed at 40–50° C. with 500 ml. of water for 1 hour. After cooling the solution is made slightly alkaline with dilute aqueous ammonia and extracted with chloroform. After evaporation of the chloroform, the residue is dissolved in ethyl acetate and acidified with a solution of hydrogen chloride gas in ethyl acetate. The hydrochloride of 17-monochloroacetyl ajmaline so obtained is filtered, washed thoroughly with ethyl acetate, and is crystallised from either an acetone/ether mixture or from methyl-ethyl ketone. M.P. 243–246° C.; $[\alpha]_D^{20} = +29°$ (C.=1, ethanol); equivalent weight: found 440.0; calculated 439.4.

(b) 16.5 g. of 17,21-dimonochloroacetyl ajmaline hydrochloride are warmed at 40–50° C. with 500 ml. of water for 1 hour. After filtration and cooling, 25 g. of ammonium chloride dissolved in 50 mls. of water is added to the solution which contains 17-monochloroacetyl ajmaline hydrochloride.

The hydrochloride of 17-monochloroacetyl ajmaline precipitates immediately; it is filtered and crystallised from alcohol or from a ketone (acetone or methylethyl ketone).

EXAMPLE II

17-butyryl ajmaline and its hydrochloride 28 g. of 17,21-dibutyryl ajmaline hydrochloride are dissolved in 500 ml. of 80 percent ethanol containing 30 ml. of concentrated ammonia; the solution is boiled under reflux for three hours. The ethanol is then evaporated and the residue extracted with chloroform. The solution in chloroform is evaporated to dryness and the residue dissolved in isopropanol and acidified with gaseous hydrogen chloride; after dilution with isopropyl ether the hydrochloride of 17-butyryl ajmaline precipitates as a microcrystalline powder which is crystallised from isopropanol. M.P. 212–214° C.; $[\alpha]_D^{20}=+35°$ (C.=1, ethanol); equivalent weight: found 433.0; calculated 433.0.

The free base is obtained from the hydrochloride by treatment with aqueous ammonia; M.P. 208–209° C.; equivalent weight: found 397.2; calculated 396.5.

EXAMPLE III

17-carbomethoxypropionyl ajmaline hydrochloride 15 g. of 17,21 di-carbomethoxypropionylajmaline hydrochloride are dissolved in 150 ml. of 90 percent methanol and 30 g. of basic ion exchange resin (available under the trademark Amberlite) are added. The mixture is stirred at room temperature for 15 hours and the resin is then separated by filtration. The filtrate is evaporated to dryness under vacuum and at a temperature below 40° C. The residue is dissolved in isopropyl alcohol and the stoichiometric quantity of anhydrous hydrochloric acid dissolved in isopropyl alcohol is added. The hydrochloride of 17-carbomethoxypropionyl ajmaline precipitates in a pure state. Melting point: 176 to 178°; $[\alpha]_D^{20}=+51°$ (c.=1, chloroform); equivalent weight: found 483 (calulated 477.0).

Other suitable basic ion exchange resins which may be used in the process of this example are those available under the trademarks "Relite" and "Dowex."

The 17,21-diacyl derivatives of ajmaline disclosed in United Kingdom patent specification No. 948,684, as well as their salts, may be converted to the corresponding 17-acyl derivatives using the techniques illustrated in the above examples.

EXAMPLE IV

17-monochloroacetyl ajmaline methyl iodide

This example illustrates the production of a quaternary ammonium salt from the free base.

The starting compound, namely 17-monochloroacetyl ajmaline may be obtained by partial hydrolysis of 17,21-di-monochloroacetyl ajmaline or by treatment of the hydrochloride of 17-monochloroacetyl ajmaline (which may be obtained as described in Example I) by dissolving it in methanol, adding ammonia and diluting with water to precipitate the free base.

6 g. of 17-monochloroacetyl ajmaline (free base) were dissolved in 30 ml. of methylethyl ketone and 3 ml. of methyl iodide were added to the resulting solution. After allowing the solution to stand for 30 hours, crude 17-monochloroacetyl ajmaline methyl iodide is obtained. The pure product is obtained by crystallization from acetonitrile. M.P. 223–226° C. $[\alpha]_D^{20}=+88°$ (C.=1, pyridine); iodine: found 23.2%, calculated 23.3%.

Examples of pharmaceutical formulations containing the compounds of the invention and of their use are given below.

(1) SUGAR-COATED TABLETS 17-monochloroacetylajmaline hydrochloride __mg__ 150
Diluents selected from starch, lactose, magnesium carbonate, magnesium stearate, talc and sugar up to _____mg__ 500

(2) CAPSULES 17-monochloroacetylajmaline hydrochloride ___mg__ 75
Glycine _____mg__ 82
Aluminium hydroxide _____mg__ 43

(3) AMPOULES (a) Lyophilized powder:
   17-monochloroacetylajmaline phosphate __mg__[1] 50
   Glycine _____mg__ 20
(b) Solvent—Purified water _____ml__ 3

(4) CAPSULES 17-monochloroacetylajmaline hydrochloride ___mg__ 75
Papaverine _____mg__ 50
Phenylethylbarbituric acid _____mg__ 35
Glycine _____mg__ 80
Aluminium hydroxide _____mg__ 40

[1] Calculated as 17-monochloroacetyl ajmaline.

The formulations under numbers 1, 2 and 3 above can be used in the prophylaxis and therapy of many diseases of sinus rhythm: they are particularly useful in the treatment of persistent arrhythmias, of arrhythmias during myocardial infarction and of persistent arrhythmias in patients treated with electrical shock. The formulation No. 4 can be used for the prophylaxis and therapy of arrhythmias combined with cardiovascular, schlerotic and hypertensive diseases with or without coronary insufficiency.

I claim:

1. 17-monochloroacetyl ajmaline and its pharmaceutically acceptable salts.

2. 17-monochloroacetyl ajmaline hydrochloride in accordance with claim 1.

3. 17-monochloroacetyl ajmaline methyl iodide in accordance with claim 1.

References Cited

FOREIGN PATENTS 622,395  12/1962  Belgium _____ 260—293.53

OTHER REFERENCES

Shamma et al.: Experientia 19 (9), 460–1 (1963).
Morrison et al.: "Organic Chemistry," 2nd Edition, Allyn and Bacon, Inc., Boston, Mass. (1966), pp. 675–9.

HENRY R. JILES, Primary Examiner

G. T. TODD, Assistant Examiner

U.S. Cl. X.R.

424—267